US011518464B2

(12) United States Patent
Begleiter et al.

(10) Patent No.: US 11,518,464 B2
(45) Date of Patent: Dec. 6, 2022

(54) METHOD, APPARATUS, AND SYSTEM FOR PROVIDING AUTOMATIC ALERTS FOR TRANSPORTATION MANEUVER EVENTS

(71) Applicant: HERE Global B.V., Eindhoven (NL)

(72) Inventors: Ron Begleiter, Tel Aviv (IL); Harel Primack, Le-Zion (IL); Silviu Zilberman, Rishon Le-Zion (IL)

(73) Assignee: HERE GLOBAL B.V., Eindhoven (NL)

( * ) Notice: Subject to any disclaimer, the term of this patent is extended or adjusted under 35 U.S.C. 154(b) by 262 days.

(21) Appl. No.: 16/883,776

(22) Filed: May 26, 2020

(65) Prior Publication Data

US 2021/0371030 A1    Dec. 2, 2021

(51) Int. Cl.
*B62J 3/10* (2020.01)
*B62J 6/057* (2020.01)
*B62J 6/045* (2020.01)

(52) U.S. Cl.
CPC ............... *B62J 3/10* (2020.02); *B62J 6/045* (2020.02); *B62J 6/057* (2020.02)

(58) Field of Classification Search
CPC ............... B62J 3/10; B62J 6/057; B62J 6/045
USPC ........................................................ 340/464
See application file for complete search history.

(56) References Cited

U.S. PATENT DOCUMENTS

| 6,542,792 | B2* | 4/2003 | Schubert | ............... | B60R 21/013 |
| | | | | | 701/1 |
| 7,221,263 | B2* | 5/2007 | Moore | ................. | A42B 3/0453 |
| | | | | | 340/432 |
| 9,457,709 | B2 | 10/2016 | Alataas | | |
| 9,567,028 | B2 | 2/2017 | Zhou | | |
| 10,086,894 | B2 | 10/2018 | Arkhangelskiy et al. | | |
| 10,711,987 | B1* | 7/2020 | Ho | ............... | B60Q 1/38 |
| 11,175,009 | B1* | 11/2021 | Ho | ............ | F21V 23/045 |
| 2014/0118129 | A1* | 5/2014 | Hutchens | ................ | B62J 6/015 |
| | | | | | 340/432 |
| 2014/0210609 | A1* | 7/2014 | Yang | .................... | B60Q 1/2676 |
| | | | | | 340/463 |
| 2017/0066492 | A1* | 3/2017 | Arkhangelskiy | .... | B60Q 1/0023 |

(Continued)

FOREIGN PATENT DOCUMENTS

| DE | 202014103134 U1 | 8/2014 |
| EP | 1134127 A2 | 9/2001 |
| GB | 2528844 A1 | 2/2016 |

OTHER PUBLICATIONS

Coxworth, "Bike Backpack Has Its Own Lights, Turn Signals and Alarm", Apr. 12, 2016, pp. 1-8.

*Primary Examiner* — Kam Wan Ma
(74) *Attorney, Agent, or Firm* — Peter H. Yu; HERE Global B.V.

(57) ABSTRACT

An approach is provided for determining vehicle maneuver events. The approach, for example, involves determining sensor data from a sensor of a device associated with a vehicle. The sensor data includes a maneuver parameter represented using a device frame of reference. The approach also involves transforming the maneuver parameter from the device frame of reference to an Earth frame of reference. The approach further involves automatically detecting a maneuver event of the vehicle based on the maneuver parameter as transformed to the Earth frame of reference. The approach further involves providing the detected maneuver event to a signaling unit associated with the vehicle.

13 Claims, 13 Drawing Sheets

(56) References Cited

U.S. PATENT DOCUMENTS

2018/0290704 A1* 10/2018 Grinfeld .................. B62J 6/045
2019/0147267 A1*  5/2019 Aizawa ................ G06V 20/597
                                                    340/576

* cited by examiner

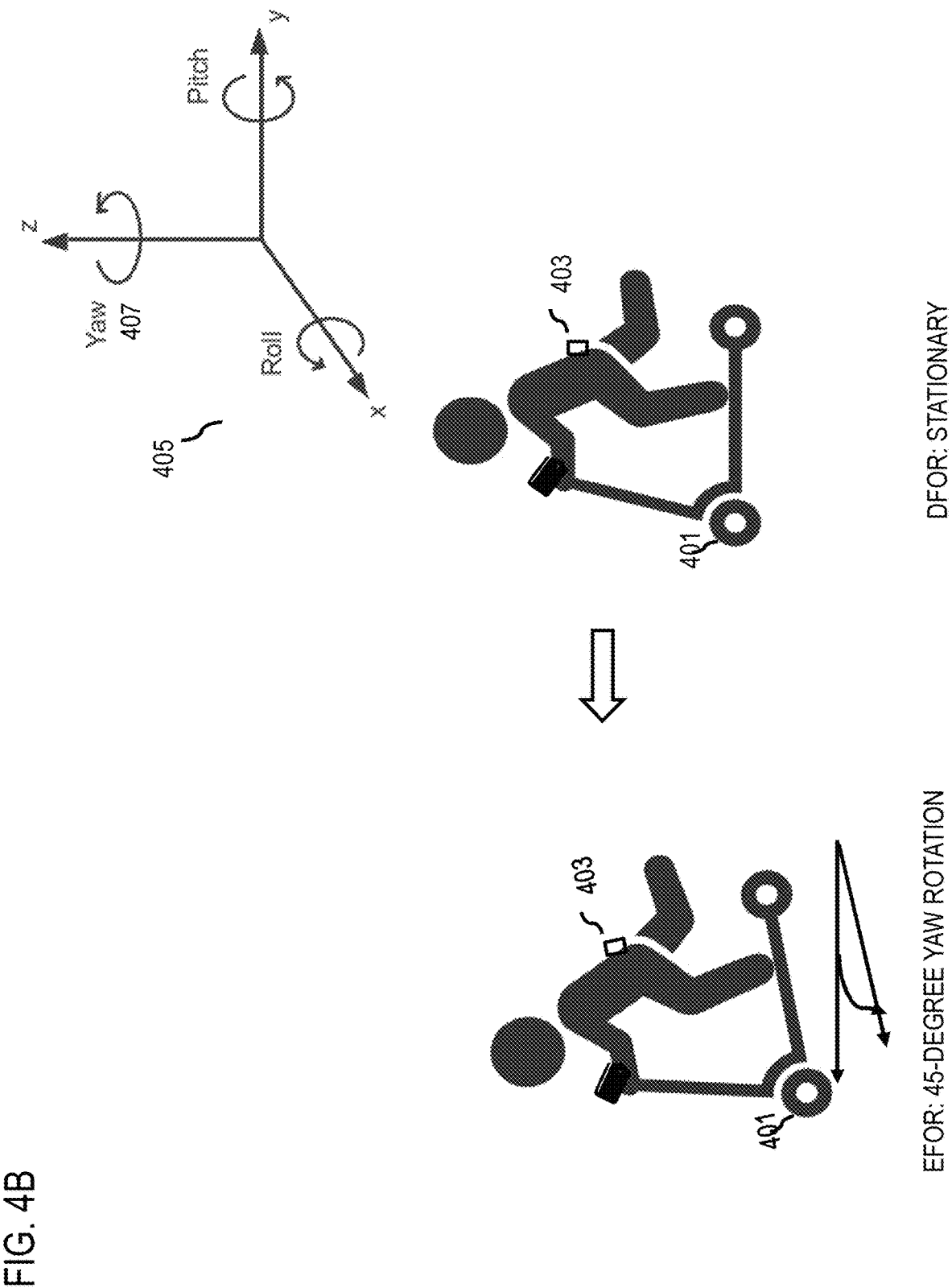

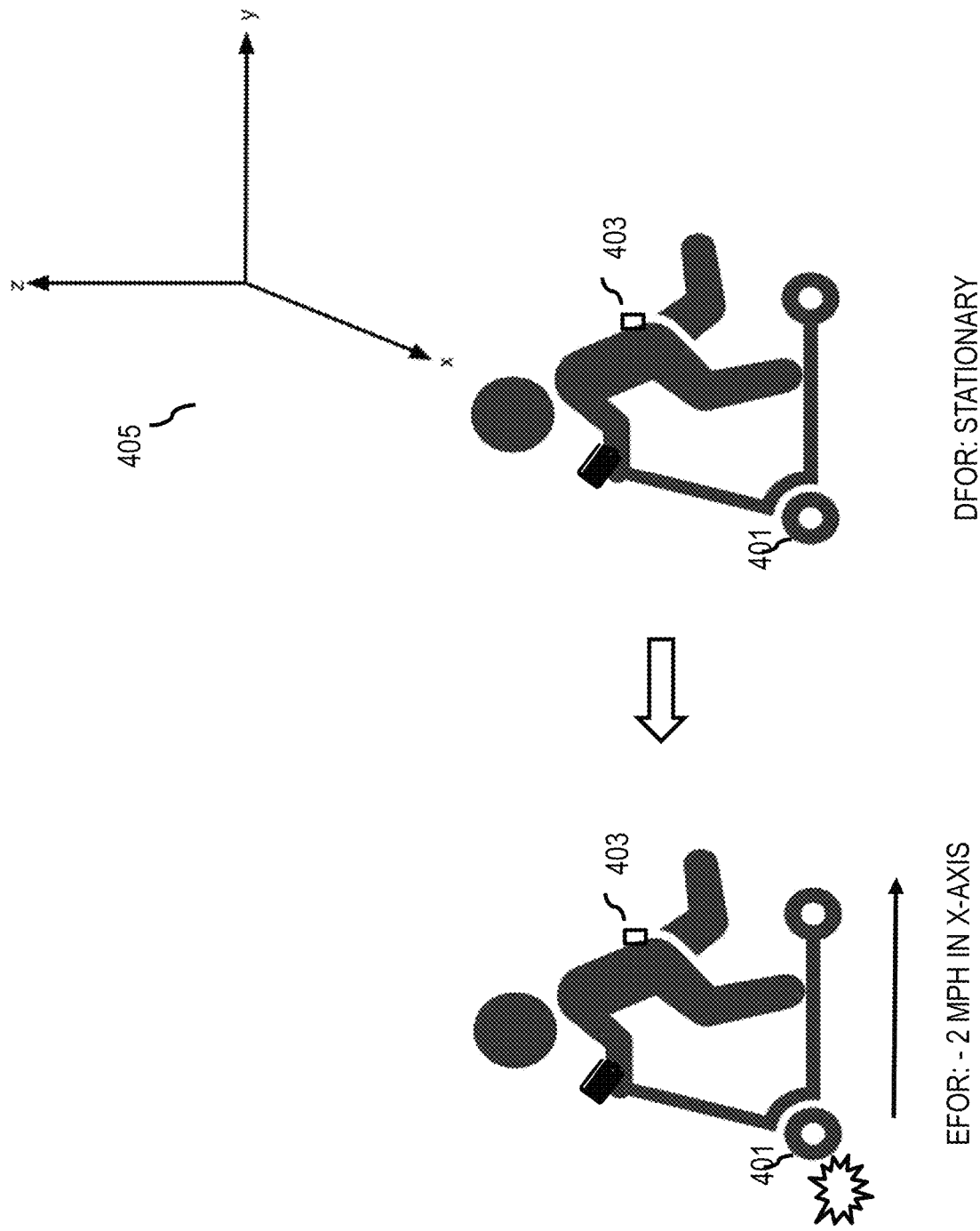

METHOD, APPARATUS, AND SYSTEM FOR PROVIDING AUTOMATIC ALERTS FOR TRANSPORTATION MANEUVER EVENTS

BACKGROUND

As micro-mobility modes of transport, such as kick-scooters, shared bicycles, etc., become popular for last-mile travels, more accidents happen since these modes of transport are vulnerable compared to alternative modes. Especially, when taking a turn in a crowded city environment, or making an abrupt stoppage, etc., the micro-mobility modes of transport are not equipped with automotive lighting systems to alert transportation maneuver events, such as a change in direction, acceleration/deceleration, etc. of a vehicle for nearby drivers and pedestrians. Generally, a vehicle can detect its own transportation maneuver events (e.g., turning, braking, etc.) by using an inertial measurement unit (IMU) in conjunction with Global Positioning System (GPS) or other equivalent positioning technologies. However, satellite-based positioning may become unavailable because of signal interference, loss of line-of-sight to orbiting satellites, etc. As a result, service providers face significant technical challenges to automatically determine and signal the transportation maneuver events for a micro-mobility mode of transport using IMU when GPS is unavailable.

SOME EXAMPLE EMBODIMENTS

Therefore, there is a need for an approach for automatically detecting transportation maneuver events (e.g., turns, stoppages, etc.) of micro-mobility modes of transport using alternative sensor technologies to trigger visual, audio, or other safety signals.

According to one embodiment, a method comprises determining sensor data from a sensor of a device associated with a vehicle. The sensor data includes a maneuver parameter represented using a device frame of reference. The method also comprises transforming the maneuver parameter from the device frame of reference to an Earth frame of reference. The method further comprises automatically detecting a maneuver event of the vehicle based on the maneuver parameter as transformed to the Earth frame of reference. The method further comprises providing the detected maneuver event to a signaling unit associated with the vehicle.

According to another embodiment, an apparatus comprises at least one processor, and at least one memory including computer program code for one or more computer programs, the at least one memory and the computer program code configured to, with the at least one processor, cause, at least in part, the apparatus to determine sensor data from a sensor of a device associated with a vehicle. The sensor data includes a maneuver parameter represented using a device frame of reference. The apparatus is also caused to transform the maneuver parameter from the device frame of reference to an Earth frame of reference. The apparatus is further caused to automatically detect a maneuver event of the vehicle based on the maneuver parameter as transformed to the Earth frame of reference. The apparatus is further caused to provide the detected maneuver event to a signaling unit associated with the vehicle.

According to another embodiment, a computer-readable storage medium carries one or more sequences of one or more instructions which, when executed by one or more processors, cause, at least in part, an apparatus to determine sensor data from a sensor of a device associated with a vehicle. The sensor data includes a maneuver parameter represented using a device frame of reference. The apparatus is also caused to transform the maneuver parameter from the device frame of reference to an Earth frame of reference. The apparatus is further caused to automatically detect a maneuver event of the vehicle based on the maneuver parameter as transformed to the Earth frame of reference. The apparatus is further caused to provide the detected maneuver event to a signaling unit associated with the vehicle.

According to another embodiment, an apparatus comprises means determining sensor data from a sensor of a device associated with a vehicle. The sensor data includes a maneuver parameter represented using a device frame of reference. The apparatus also comprises means for transforming the maneuver parameter from the device frame of reference to an Earth frame of reference. The apparatus further comprises means for automatically detecting a maneuver event of the vehicle based on the maneuver parameter as transformed to the Earth frame of reference. The apparatus further comprises means for providing the detected maneuver event to a signaling unit associated with the vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4C depict transformations of frames of reference to determine maneuver events of a vehicle, according to various embodiments;

DESCRIPTION OF SOME EMBODIMENTS

Examples of a method, apparatus, and computer program for determining vehicle maneuver events are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
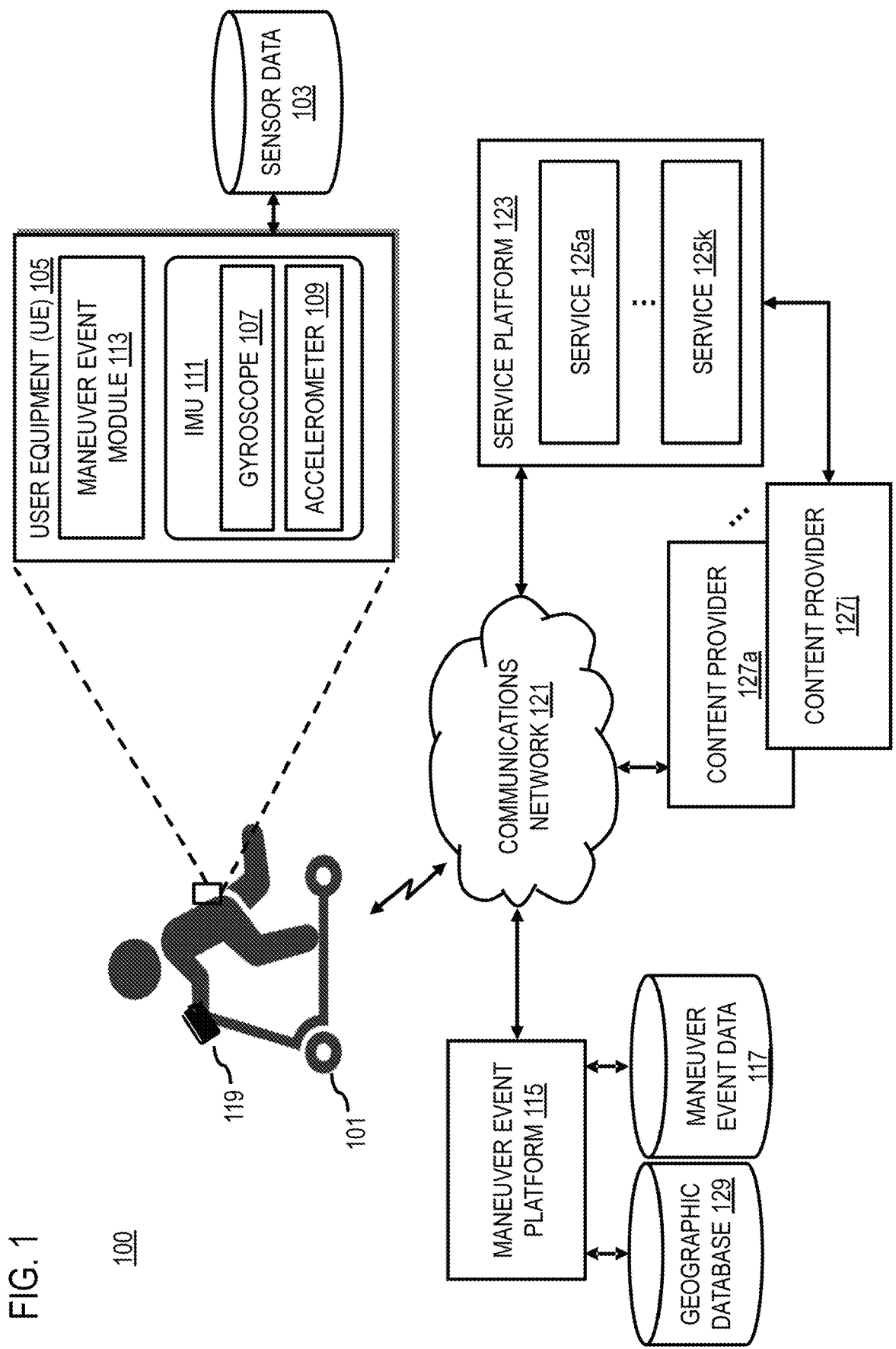
FIG. 1 is a diagram of a system capable of determining vehicle maneuver events using sensor data and frame of reference transformation, according to one embodiment.

FIG. 1 is a diagram of a system capable of determining vehicle maneuver events using sensor data and frame of reference transformation, according to one embodiment. Embodiments of the technology described herein relate to estimating a maneuver event (e.g., turning, braking, etc.) of a moving object (e.g., a vehicle, a skateboard, a robot, etc.) using IMUs in the absence of location and/or orientation data of a device with respect to the vehicle. IMUs are commonly used to maneuver vehicles, such as aircraft, automobiles, etc. Although IMUs can accumulate measurement errors with respect to time to calculate velocity and position ('drift errors'), the drift errors can be continually corrected via GPS signals.

However, GNSS data (e.g., GPS) may be unavailable (e.g., when the receiver is traveling underground), sparsely available (e.g., due to local interferences or weak satellite signals), or very inaccurate (e.g., near high-rise buildings). The exiting vehicle maneuver event detection can use IMU sensors without GPS signal yet requires known orientation and location of the IMU with respect to the vehicle. Nevertheless, the orientation and location of the IMU are not always known. There is a need to circumvent the limited accuracy of the IMU thus using it to automatically determine transportation maneuver events within its accuracy limitations and the lack of GPS data and IMU orientation and location data.

To address the technical challenges related to determining the transportation maneuver event of a moving object (e.g., a vehicle 101) in the absence of GPS data and IMU orientation and location data, the system 100 of FIG. 1 introduces a capability to use sensor data 103 that includes a maneuver parameter represented using a device frame of reference from which the vehicle maneuver event of the moving object can be inferred. In one embodiment, the sensor data 103 is available in a user equipment (UE) device 105 (e.g., a smartphone, a fitness tracker, a gaming or virtual reality wearable or equivalent mobile device, etc.) travelling with the vehicle 101. The UE 105 may contain one or more angular velocity sensors (e.g., a gyroscope 107) and/or one or more acceleration sensors (e.g., an accelerometer 109). By way of example, the gyroscope 107 and/or accelerometer 109 may be included in an inertial measurement unit (IMU) 111 along with other sensors such as, but not limited to, a magnetometer.

Generally, modern mobile devices (e.g., UEs 105) are equipped with multiple sensing units such as GNSS, IMU, pressure sensors, proximity sensors, etc. These sensors allow for determination of position, acceleration, magnetic field, angular rotation rate, and in theory, one can use those measurement to know the exact position, velocity, acceleration and orientation of the device at any time. However, in practice, knowledge of position, velocity, etc. can be limited by the availability and/or accuracy of the sensors.

One such situation is a limitation of the IMU, although IMU can be used without interacting with external environment to provide data back for localization, perception, and control. For example, consumer gyroscopes sense angular velocity (angular rate) along one rotational axis, the gyroscopes still need to know an initial orientation to obtain the absolute orientation and rate values. A sensor (e.g., a magnetometer) can directly measure the absolute orientation of the device (e.g., the UE 105), but such sensor may be weak, inaccurate or unavailable. When GPS data is also unavailable (e.g. in tunnels, underground parking, etc.) or inaccurate (e.g., nearby high-rise buildings) or sparse (e.g., keep low sampling rate to save on power consumption), turn detection using the gyroscope 107 requires that the UE 105

(hence the IMU 11) fixed in a predetermined position and orientation with respect to the vehicle 101.

In one embodiment, when the UE 105 is fixed to the vehicle 101 at an unknown orientation relative to the vehicle 101, the system 100 (e.g., via a maneuver event module 113 local to the UE 105 and/or via a maneuver event platform 115 on the network side) can process the sensor data 103 including a maneuver parameter represented using a device frame of reference (DFOR), to transform the maneuver parameter from the DFOR to an Earth frame of reference (EFOR) for the vehicle 101. The system 100 then automatically detects a maneuver event (e.g., a turning) of the vehicle based on the maneuver parameter.

By way example, in one embodiment (e.g., in a vehicle setting where the UE 105 is mounted in or otherwise associated with the vehicle 101), the system 100 uses existing sensing components of the IMU 111 (e.g., the gyroscope 107) to obtain sensor data of the gyroscope 107, e.g., an angle change in a device frame of reference, to determine the vehicle 101's orientation change and a turning event, via continuously monitoring the device angle change in the EFOR over a time period, and then determines a turning event occurs when the angle change in EFOR is greater than a threshold angle.

In one embodiment, the system 100 transforms a maneuver parameter from the device frame of reference to the Earth frame of reference based on accelerometer data collected from the accelerometer 109 measured in a rest state to direct measure a negative acceleration thus detecting a braking event. By way of example, a braking event can be easily detected when vehicle coordinates are known and the UE 105 is fixed to the vehicle 101 at a fixed setup relative to the vehicle (e.g. in a designed holder). However, when the UE 105 is in the micro-mobility vehicle in a unknown setup relative to the vehicle, detecting a braking event of the vehicle 101 becomes difficult. Accordingly, the system 100 can use existing sensing components of the IMU 111 (e.g., the accelerometer 109) to directly measure a negative acceleration of the vehicle 101 thus detecting a braking event in the absence of GPS data and the UE 105 setup relative to the vehicle.

It is noted that the gyroscope 107 and/or accelerometer 109 discussed with respect to the embodiments described herein are provided by way of illustration and not as limitations. It is contemplated that any other type of sensors (e.g., other than GNSS/GPS) that can provide information for deriving orientation changes or negative acceleration can be used. For example, non-DC-sensitive angular rate sensors can be used the same way as the gyroscope 107.

In one embodiment, the various embodiments described herein opens the way for much more accurate navigation and/or other location-based services by providing maneuver event data 117, especially when GNSS data is unavailable or sparse. For example, the maneuver event data 117 can be provided by the system 100 as an output to a signaling unit 119 associated with the vehicle 101. In one embodiment, the signaling unit 119 initiates a visual presentation (e.g., a turning or braking light) to indicate the detected vehicle maneuver event. In another embodiment, the signaling unit 119 initiates an audio presentation (e.g., a turning or braking alarm) to indicate the detected vehicle maneuver event.

In other embodiments, the maneuver event data 117 can be provided by the system 100 as an output over a communications network 121 to a service platform 123 including one or more services 125a-125k (also referred to as services 125). As discussed above, the services 125 can include, but are not limited to, mapping services, navigation services, and/or the like that can combine the maneuver event data 117 with digital map data (e.g., a geographic database 129) to provide location-based services, such as high definition map data services (e.g., supporting autonomous driving). It is also contemplated that the services 125 can include any service that uses the maneuver event data 117 to provide or perform any function. In one embodiment, the maneuver event data 117 can also be used by one or more content providers 127a-127j (also collectively referred to as content providers 127). These content providers 127 can aggregate and/or process the maneuver event data 117 to provide the processed data to its users such as the service platform 123 and/or services 125.

Figure 2:
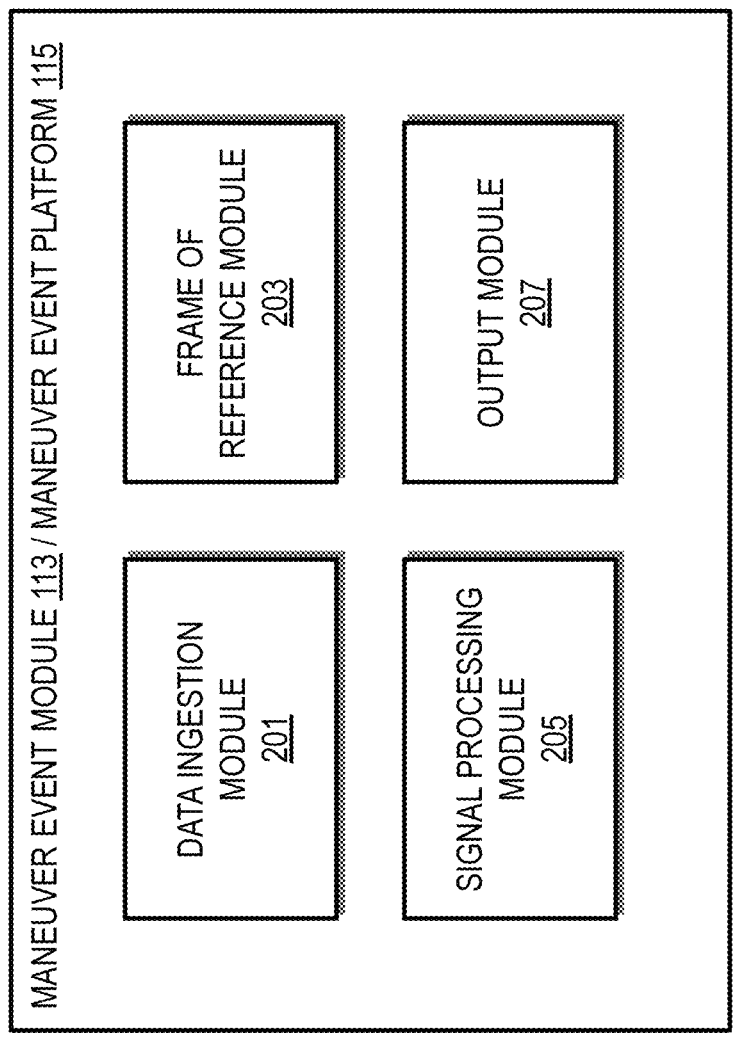
FIG. 2 is a diagram of a maneuver event module/maneuver event platform capable of determining vehicle maneuver events using sensor data and frame of reference transformation, according to one embodiment.

FIG. 2 is a diagram of a maneuver event module/maneuver event platform capable of determining vehicle maneuver events using sensor data and frame of reference transformation, according to one embodiment. In one embodiment, the maneuver event module 113 (e.g., a local component) and/or maneuver event platform 115 (e.g., a network/cloud component) may perform one or more functions or processes associated with determining vehicle maneuver events based on IMU or equivalent sensor data. By way of example, as shown in FIG. 2, the maneuver event module 113 and/or maneuver event platform 115 include one or more components for performing functions or processes of the various embodiments described herein. It is contemplated that the functions of these components may be combined or performed by other components of equivalent functionality. In one embodiment, the maneuver event module 113 and/or maneuver event platform 115 include a data ingestion module 201, a frame of reference module 203, a signal processing module 205, and an output module 207. The above presented modules and components of the maneuver event module 113 and/or maneuver event platform 115 can be implemented in hardware, firmware, software, or a combination thereof. In one embodiment, the maneuver event module 113, maneuver event platform 115, and/or any of their modules 201-207 may be implemented as a cloud-based service, local service, native application, or combination thereof. The functions of maneuver event module 113, maneuver event platform 115, and modules 201-207 are discussed with respect to FIGS. 3-8 below.

Figure 3:
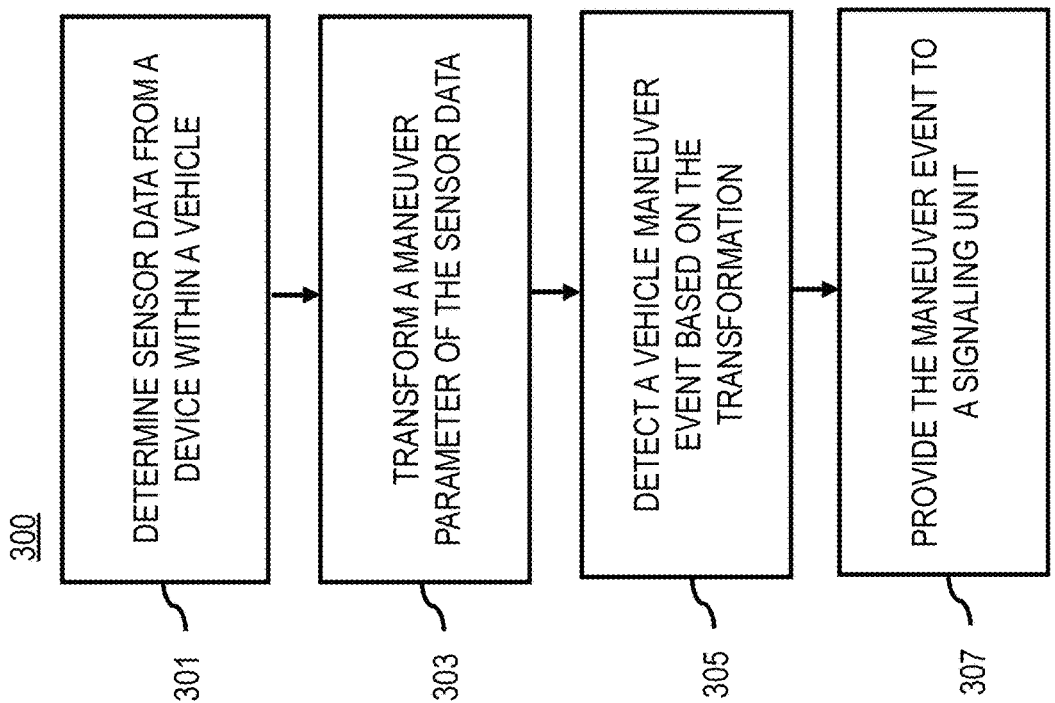
FIG. 3 is a flowchart of a process for determining vehicle maneuver events using sensor data and frame of reference transformation, according to one embodiment.
Figure 10:
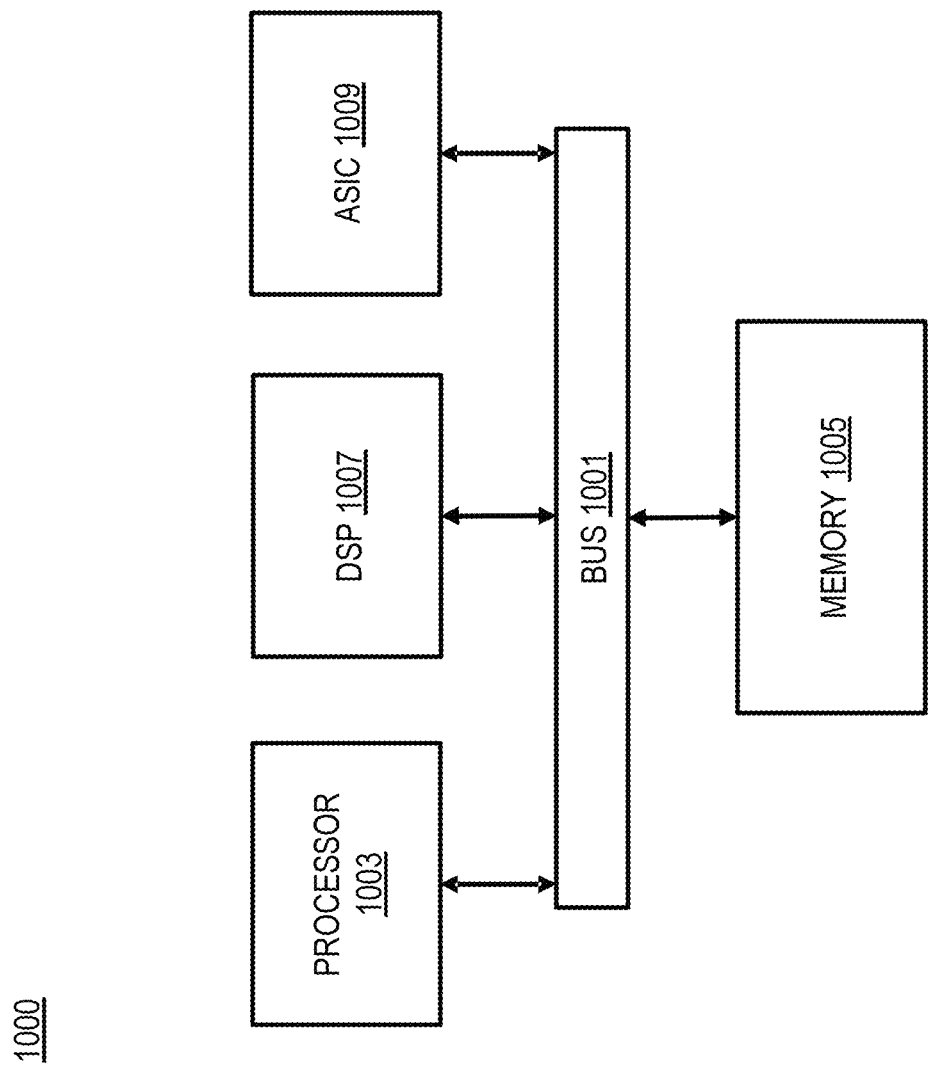
FIG. 10 is a diagram of a chip set that can be used to implement an embodiment.

FIG. 3 is a flowchart of a process for determining vehicle maneuver events using sensor data and frame of reference transformation, according to one embodiment. In various embodiments, the maneuver event module 113, maneuver event platform 115, and/or any of their modules 201-207 may perform one or more portions of the process 300 and may be implemented in, for instance, a chip set including a processor and a memory as shown in FIG. 10. As such, the maneuver event module 113, maneuver event platform 115, and/or any of their modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all the illustrated steps.

As discussed above, the existing method using components (e.g., gyroscopes 107, accelerometers 109, etc.) in IMU 111 requires the knowledge of a device setup (e.g., orientation and location) relative to the vehicle 101, to measure the maneuver event of the vehicle 101 which the device (e.g., a UE 105 in which the IMU 111 is installed) travelling with. In one embodiment, the process 300 provides a practical approach for detecting maneuver events using the gyroscope 107 and/or accelerometer 109 components of the IMU 111, taking advantage of a device frame of reference.

Figure 4A:
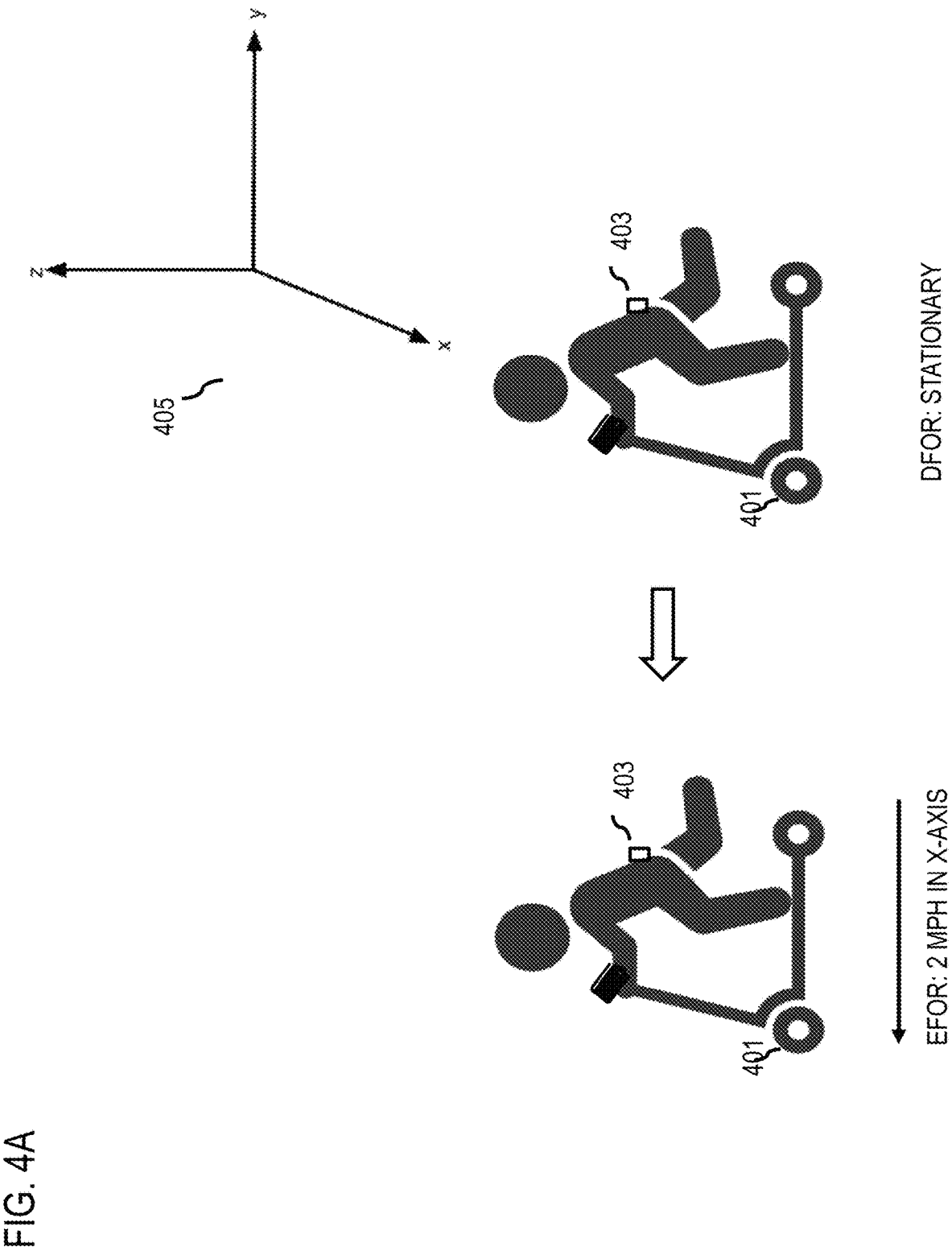

For example, in step 301, the data ingestion module 201 determines sensor data 103 from a sensor (e.g., a gyroscope 107, an accelerometer 109, etc.) of a device (e.g., UE 105) associated with a vehicle 101. In one embodiment, the sensor data 103 includes a maneuver parameter represented using a device frame of reference. Accordingly, in step 303, the frame of reference module 203 can transform the maneuver parameter from the device frame of reference (e.g., determined according to step 301 or equivalent) to an Earth frame of reference. FIGS. 4A-4C depict transformations of frames of reference to determine maneuver events of a vehicle, according to various embodiments.

FIG. 4A depicts a transformation from a device frame of reference into the Earth frame of reference, when the device (e.g., UE 403) is fixed to the vehicle 401. By way of example, the UE 403 is tightly inserted in the rider's back packet such that there is no relative movement of the UE 403 with respect to the vehicle 401. In this example, from the device's frame of reference, the vehicle 401 is stationary. After the transformation into an Earth frame of reference expressed in a three-dimensional coordinate system (e.g., a Cartesian coordinate system 405), the vehicle 401 travels in 2 mph in X axis. The three-dimensional coordinate system may be a polar coordinate system, a cylindrical coordinate system, a spherical coordinate system, a curvilinear coordinate system, a log-polar coordinate system, a Plucker coordinate system, a canonical coordinate system, a Barycentric coordinate system, a Trilinear coordinate system, etc.

For determining a turning event, the maneuver parameter is an angle change in the Earth frame of reference over a time period, and the sensor data 103 includes information from the gyroscope 107 and rotation vector (RV) data. FIG. 4B depicts an example frame of reference transformation in which a turning event is determined from sensor data 103, especially gyroscope data. By way of example, the UE 403 is tightly inserted in the rider's back packet such that there is no relative movement of the UE 403 with respect to the vehicle 401. In this example, from the device's frame of reference, the vehicle 401 is stationary. After the transformation into an Earth frame of reference expressed in a three-dimensional coordinate system (e.g., a Cartesian coordinate system 405), the vehicle 401 makes a 45-degree left turn in Yaw axis 407.

In one embodiment, the signal processing module 205 determines the RV using the IMU data. The RV serves as a rotation operator to translate the device frame of reference (DFOR) to the Earth frame of reference (EFOR), using the following mathematics. $v_d$ is a constant velocity vector of the device expressed in DFOR, $v_e(t_0)$ and $v_e(t_1)$ are velocity vectors of the device expressed in EFOR at times $t_0$ and $t_1$ respectively.

$v_e(t_0) = R(t_0)v_d(t_0)$, the expression of $v_e(t_0)$ with respect to $v_d$ in EFOR for time $t_0$ $v_e(t_1) = R(t_1)v_d(t_1)$, the expression of $v_e(t_1)$ with respect to $v_d$ in EFOR at time $t_1$ R(t) is the RV operator at time t, which can be expressed as a matrix, such as a 3×3 matrix in Euler angles, or in quaternions.

$R(t_1) = R(t_0 + \Delta t) = R(t_0)R(dt)$, assuming $v_d(t_0) = v_d(t_1)$:
$v_e(t_1) = R(t_0)R(dt)v_d(t_0) = R(t_0)R(\Delta t)R^{-1}(t_0)v_e(t_0)$ Such operator $Q = R(t_0)R(\Delta t)R^{-1}(t_0)$ transforms between the velocity vectors $v_e(t_0)$ and $v_e(t_1)$ that rotate with the device and expressed in the EFOR.

The operator R ($t_0$) is taken from the RV data immediately before the beginning of a turning event. R(Δt) is the gyroscope data integrated over the time interval Δt, and is computed using the gyroscope data. The RV may be a "software sensor" determined by of the frame of reference module 203 using only the IMU data.

The operator Q is used to detect the existence of a turn, e.g., by measuring its deviation from the unit operator, or by estimating the amount of rotation in the azimuthal plane (east-north). In step 305, transforming the maneuver parameter from the device frame of reference to the Earth frame of reference according to the embodiments described with respect to step 303, the signal processing module 205 can automatically detect a maneuver event of the vehicle based on the maneuver parameter as transformed to the Earth frame of reference. In one embodiment, the signal processing module 205 iteratively extends the time period for determining the angle change by an extension period based on determining that the angle change is greater than a threshold angle, and determines the turning event over the iteratively extended time period. The signal processing module 205 can apply various thresholds for determining maneuver events. By way of example, the signal processing module 205 determines a right turn when the angle change is between 45 to 135 degrees, a left turn when the angle change is between 225 to 315 degrees, and a deviation from a road segment when the angle change is between −45 to 45 degrees.

The signal processing module 205 can also provide the qualitative features of the turning event, e.g., its inclination and its angular span in the horizontal plane. The turning event is represented by an inclination, an angular span, or a combination thereof of the iteratively extended time period.

Figure 5:
FIG. 5 is a diagram of a user interface showing a vehicle trajectory on a map, according to one embodiment.

FIG. 5 is a diagram of a user interface 501 showing a vehicle (e.g., a shared bicycle) trajectory on a map, according to one embodiment. In particular, FIG. 4 depicts four detected turning events of the vehicle with markers 503a-503p. The ride is taken along road segments 505a-505c from left to right in the map. In FIG. 4, the vehicle turned right form road segment 505a onto road segment 505b, turned left form road segment 505b onto road segment 505c, turned right to get in a circle/roundabout 507, and turned left to get out of the circle/roundabout 507. Markers 503a, 5031 signify right turns, markers 503c, 503m signify left turns, markers 503e, 503g, 503i, 503k, 503o signify deviations from the respective road segments 505a-505c, markers 503b, 503d, 503n signify the respective end of each of the turns, and markers 503f, 503h, 503j, 503n, 503p signify the respective end of each of the deviations. The turn detection matches the actual turns of the vehicles.

Figure 6:
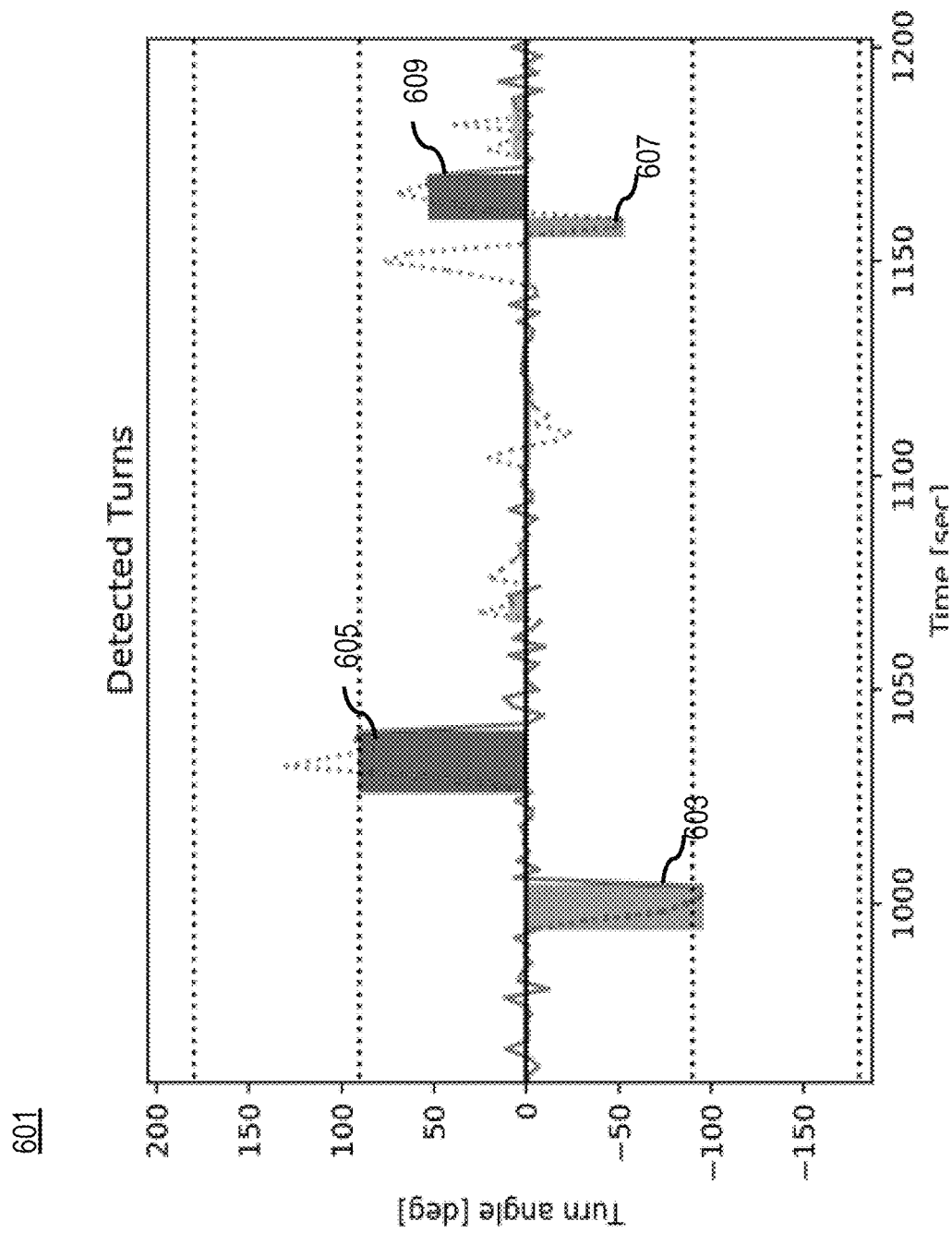
FIG. 6 is a diagram depicting the azimuthal extent of the detected turns as a function of time, according to one embodiment.

The same turning information is depicted FIG. 6. FIG. 6 is a diagram 601 depicting the azimuthal extent of the detected turns as a function of time, according to one embodiment. This vehicle turn diagram 601 presents the angle change values versus time as a plot of the vehicle 101's turns. FIG. 6 shows a 90-degree right turn 603 around 1000 seconds from the beginning of the ride, a 90-degree left turn 605 around 1040 seconds, a 60-degree right turn 607 around 1160 seconds, and an immediate 60-degree left turn 609.

For determining a braking event, the maneuver parameter is a negative acceleration, and the sensor data 103 includes information from the accelerometer 109. In one embodiment, the signal processing module 205 transforms the maneuver parameter from the device frame of reference to the Earth frame of reference is based on accelerometer data collected from the accelerometer 109 measured in a rest state. FIG. 4C depicts an example frame of reference transformation in which a braking event is determined from sensor data 103, especially accelerometer data.

A braking event can be easily detected if the vehicle coordinates are known. Braking corresponds to acceleration in the negative X axis. If the UE 403 is positioned in a known setup relative to the vehicle 401 (e.g., in a designed holder), the transformation to Earth frame of reference is trivial. However, when the relative orientation is unknown but fixed in time, such as that the UE 403 is tightly inserted in the rider's back packet such that there is no relative movement of the UE 403 with respect to the vehicle 401, the frame of reference module 203 can deduce the vehicle coordinates using accelerometer data as follows.

In one embodiment, the frame of reference module 203 can deduce the vehicle coordinates in the Earth frame of reference using accelerometer data by directly measuring the gravitation direction at rest state and defines the –Z direction:

$$\hat{z} = -\frac{\overrightarrow{a_{rest}}}{|\overrightarrow{a_{rest}}|}$$

In one embodiment, the frame of reference module 203 can determine the X direction when the braking event starts, by tracking the direction of acceleration in the plane perpendicular to the Z axis:

$$\hat{x} = \frac{\vec{a}}{|\vec{a}|}$$

The frame of reference module 203 can determine the Y direction by $$\hat{y} = \hat{z} \times \hat{x}$$

In another embodiment, the frame of reference module 203 can determine the X direction when the braking event starts, by filtering out the gravitational contribution in the linear accelerometer data.

The signal processing module 205 then uses vehicle coordinates in the Earth frame of reference to determine whether there was an acceleration in the negative X axis. In FIG. 4C, from the device's frame of reference, the vehicle 401 is stationary. After the transformation into an Earth frame of reference expressed in a three-dimensional coordinate system (e.g., a Cartesian coordinate system 405), the vehicle 401 is determined as braking at −2 mph in X axis.

In one embodiment, the gyroscope 107, accelerometer 109, and/or equivalent sensors can be installed within a mobile device or smartphone (e.g., a UE 105) traveling within the vehicle 101. For example, the UE 105 can be mounted to the dashboard or other position within the vehicle 101 or carried by a driver/passenger of the vehicle 101. The sensors can be standalone sensors within the UE 105 or part of an IMU 111 within the UE 105. It is noted, however, that embodiments in which the sensors are included within the UE 105 are provided by way of illustration and not as a limitation. In other embodiments, it is contemplated that the sensors (e.g., the gyroscope 107 and/or accelerometer 109) may be mounted externally to the UE 105 (e.g., as a component of the vehicle 101 or other device within the vehicle 101). In addition, the maneuver event module 113 for detecting maneuver events of the vehicle 101 according to the embodiments described herein need not reside within the UE 105 and can also be included as a component of the vehicle 101 and/or any other device internal or external to the vehicle 101.

In step 307, the output module 207 provides the detected maneuver events to a signaling unit 119 (e.g., an LED light) associated with the vehicle 101. In one embodiment, the signaling unit 119 initiates a visual presentation (e.g., a turning or braking light) to indicate the detected maneuver event. The signaling unit 119 can be controlled by the UE 105 and/or vehicle 101 via a local network protocol (e.g., Bluetooth, WIFI, etc.).

Figure 7:
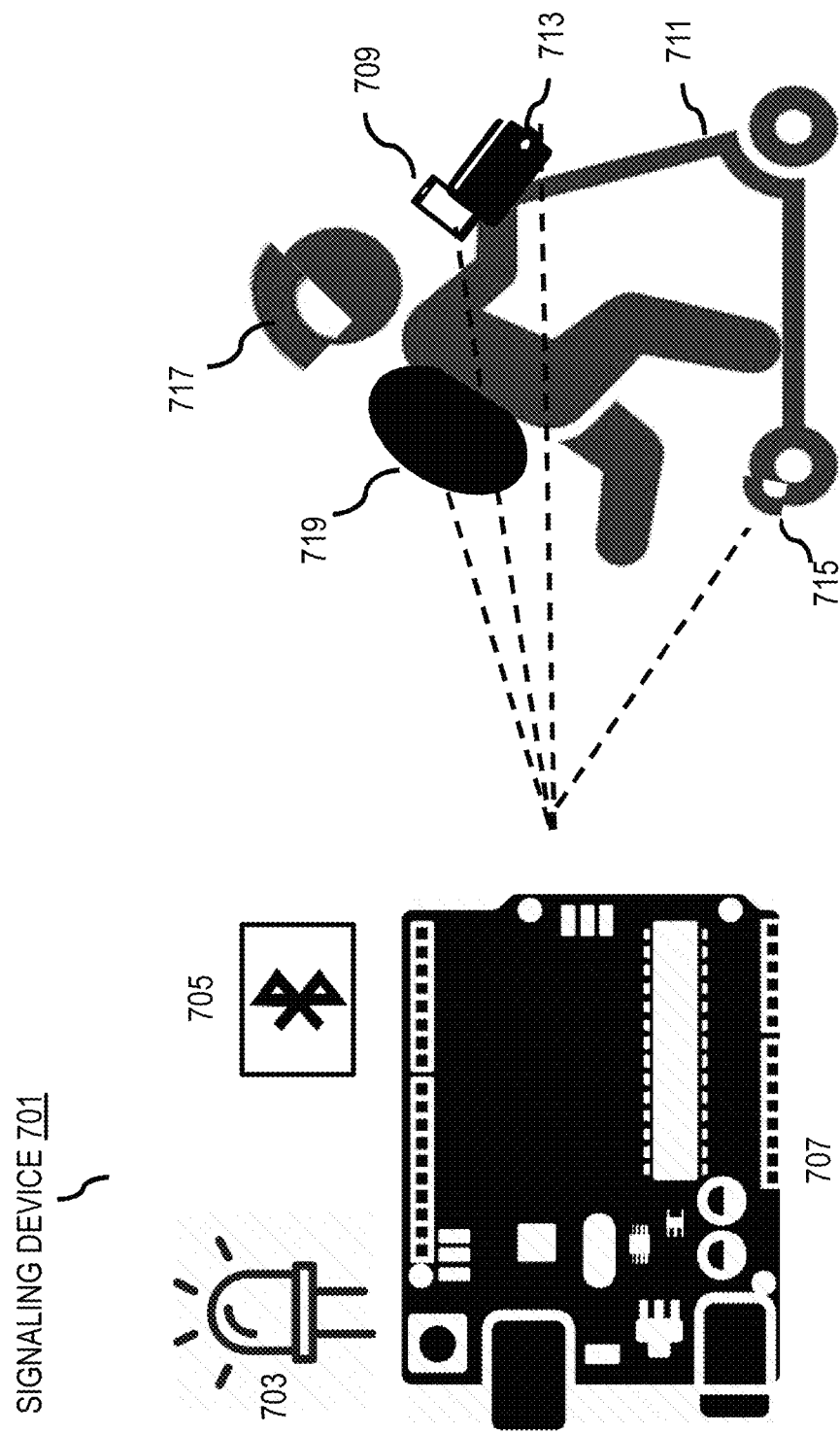
FIG. 7 depicts an implementation of a signaling unit, according to one embodiment.

FIG. 7 depicts an implementation of a signaling unit 701, according to one embodiment. The signaling unit 701 includes one or more led-lights 703, a BLUETOOTH module 705, and a microcontroller board 707. A controller (e.g., a software development kit (SDK) and/or a circuit board corresponding to maneuver event signing) embedded in the maneuver event modules 113, the UE 709, the vehicle 711, and/or the maneuver event platform 115, can control the signaling unit 701 via the Bluetooth module 707 to light on/off the led-lights 703 to sign a start/end of a turning or braking event.

In another embodiment, the signaling unit 119 initiates an audio presentation (e.g., a turning or braking alarm) to indicate the detected maneuver event. By way of example, the turning or braking alarm may be a recorded loud vehicle turning or braking sound.

The output, for instance, can be provided or transmitted to any service, application, function, component, system, device, or equivalent that requests the maneuver event data. For example, the maneuver event output can be provided to the service platform 123, any of the services 125 (e.g., autonomous driving services), any of the content providers 127, and/or the like.

In one embodiment, the signaling unit 701 can be a part of the IMU 111 within the UE 709, or a part of the UE 709. In another embodiment, the signaling unit 701 can be a part of the vehicle 711. For example, the signaling unit 701 is integrated into or mounted onto the dashboard unit 713, a rear wheel cover 715, a front packet (not shown), or other positions of the vehicle 711.

In other embodiments, the signaling unit 701 may a standalone unit independent from the IMU 111, the UE 105, and the vehicle 101. By way of example, the signaling unit 701 can be a part of a user wearable/accessory (e.g., a safety helmet 717, a backpack 719, etc.) traveling with the vehicle 711. In other embodiments, the signaling unit 701 can be carried by a driver/passenger of the vehicle 711 (e.g., on one hand, in a packer, etc.). It is noted, however, that these embodiments are provided by way of illustrations and not as limitations.

Returning to FIG. 1, the system 100 comprises one or more vehicles 101 associated with one or more UEs 105 having respective maneuver event modules 113 and/or connectivity to the maneuver event platform 115. By way of example, the UEs 105 may be a personal navigation device ("PND"), a cellular telephone, a mobile phone, a personal digital assistant ("PDA"), a watch, a camera, a computer, an in-vehicle or embedded navigation system, and/or other device that is configured with multiple sensors types (e.g., gyroscopes 107, accelerometers 109, etc.) that can be used for determined vehicle speed according to the embodiments described herein. It is contemplated, that the UE 105 (e.g., cellular telephone or other wireless communication device) may be interfaced with an on-board navigation system of an autonomous vehicle or physically connected to the vehicle 101 for serving as a navigation system. Also, the UEs 105 and/or vehicles 101 may be configured to access the communications network 121 by way of any known or still developing communication protocols. Via this communications network 121, the UEs 105 and/or vehicles 101 may transmit sensor data collected from IMU or equivalent sensors for facilitating vehicle speed calculations.

The UEs 105 and/or vehicles 101 may be configured with multiple sensors of different types for acquiring and/or generating sensor data according to the embodiments described herein. For example, sensors may be used as GPS or other positioning receivers for interacting with one or more location satellites to determine and track the current speed, position and location of a vehicle travelling along a roadway. In addition, the sensors may gather IMU data, NFC data, Bluetooth data, acoustic data, barometric data, tilt data (e.g., a degree of incline or decline of the vehicle during travel), motion data, light data, sound data, image data, weather data, temporal data and other data associated with the vehicle and/or UEs 105 thereof. Still further, the sensors may detect local or transient network and/or wireless signals, such as those transmitted by nearby devices during navigation of a vehicle along a roadway. This may include, for example, network routers configured within a premise (e.g., home or business), another UE 105 or vehicle 101 or a communicable traffic system (e.g., traffic lights, traffic cameras, traffic signals, digital signage).

By way of example, the maneuver event module 113 and/or maneuver event platform 115 may be implemented as a cloud-based service, hosted solution or the like for performing the above described functions. Alternatively, the maneuver event module 113 and/or maneuver event platform 115 may be directly integrated for processing data generated and/or provided by the service platform 123, one or more services 125, and/or content providers 127. Per this integration, the maneuver event platform 115 may perform client-side state computation of vehicle speed data.

By way of example, the communications network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 105 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 105 can support any type of interface to the user (such as "wearable" circuitry, etc.).

By way of example, the UE 105s, the maneuver event module 113/maneuver event platform 115, the service platform 123, and the content providers 127 communicate with each other and other components of the communications network 121 using well known, new or still developing protocols. In this context, a protocol includes a set of rules defining how the network nodes within the communications network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
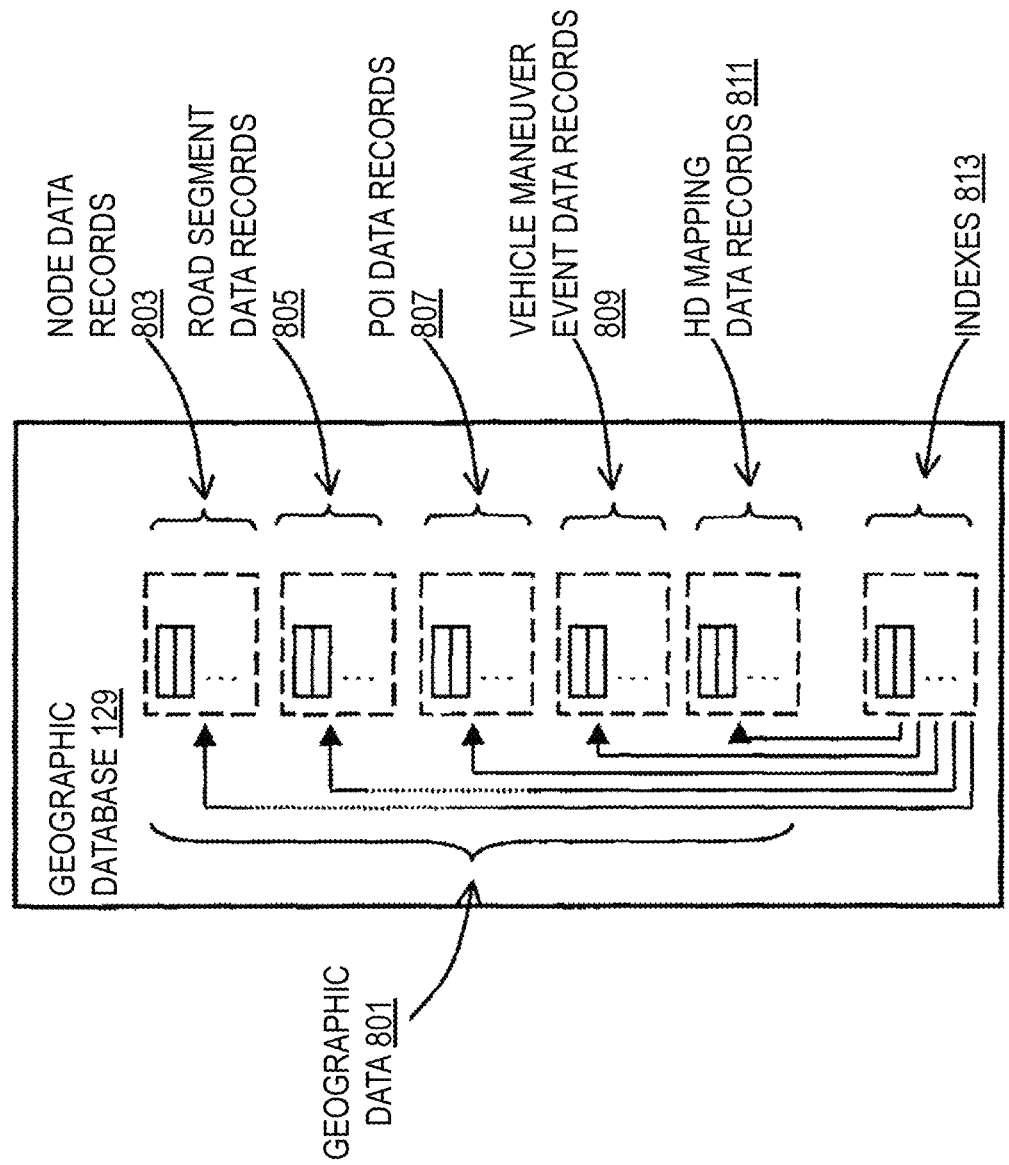
FIG. 8 is a diagram of a geographic database, according to one embodiment.

FIG. 8 is a diagram of a geographic database 129 that can be used in combination with speed data to provide location-based services, according to one embodiment. In one embodiment, the geographic database 129 includes geographic data 801 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 801. In one embodiment, the geographic database 129 include high definition (HD) mapping data that provide centimeter-level or better accuracy of map features. For example, the geographic database 129 can be based on Light Detection and Ranging (LiDAR) or equivalent technology to collect billions of 3D points and model road surfaces and other map features down to the number lanes and their widths. In one embodiment, the HD mapping data (e.g., HD data records 811) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 129.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 129 follows certain conventions. For example, links do not cross themselves and do not cross each other except at a node. Also, there are no duplicated shape points, nodes, or links. Two links that connect each other have a common node. In the geographic database 129, overlapping geographic features are represented by overlapping polygons. When polygons overlap, the boundary of one polygon crosses the boundary of the other polygon. In the geographic database 129, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 129 includes node data records 803, road segment or link data records 805, POI data records 807, vehicle maneuver event data records 809, HD mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 129. In one embodiment, the indexes 813 may be used to quickly locate data without having to search every row in the geographic database 129 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 129 can contain path segment and node data records or other data that represent pedestrian paths or areas in addition to or instead of the vehicle road record data, for example. In one embodiment, the nodes and links can make up the base map and that base map can be associated with an HD layer including more detailed information, like lane level details for each road segment or link and how those lanes connect via intersections. Furthermore, another layer may also be provided, such as an HD live map, where road objects are provided in detail in regard to positioning, which can be used for localization. The HD layers can be arranged in a tile format.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 129 can include data about the POIs and their respective locations in the POI data records 807. The geographic database 129 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 129 can also include vehicle maneuver event data records 809 for storing include vehicle maneuver event data determined from sensor data 103 according to the embodiments described herein. The vehicle maneuver event data records 809 can also store related data including but not limited to sensor data 103, IMU sensor data, and/or any other data used or generated according to the embodiments described herein. By way of example, the vehicle maneuver event data records 809 can be associated with one or more of the node records 803, road segment records 805, and/or POI data records 807 to associate the determined vehicle maneuver event data with specific geographic areas or features.

In one embodiment, as discussed above, the HD mapping data records 811 model road surfaces and other map features to centimeter-level or better accuracy (e.g., including centimeter-level accuracy for ground truth objects used for visual odometry based on polyline homogeneity according to the embodiments described herein). The HD mapping data records 811 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 811 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like. The HD mapping data records may be provided as a separate map layer.

In one embodiment, the geographic database 129 can be maintained by the content provider 127 in association with the services platform 123 (e.g., a map developer). The map developer can collect geographic data to generate and enhance the geographic database 129. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 129 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. Other formats including tile structures for different map layers may be used for different delivery techniques. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 101 and/or UE 105. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining vehicle maneuver events based on sensor data 103 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
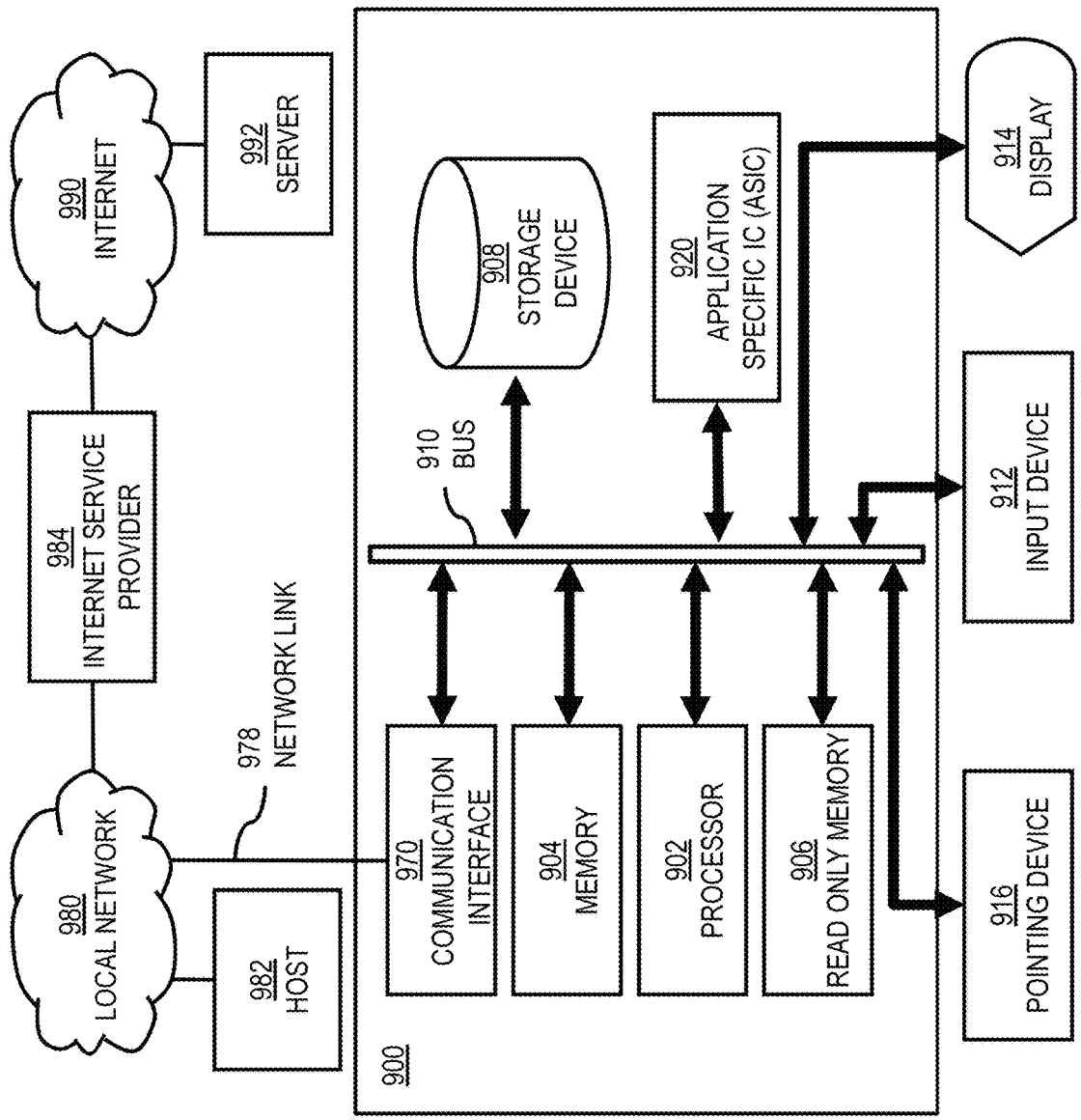
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to determine vehicle maneuver events based on sensor data 103 as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to determining vehicle maneuver events based on sensor data 103. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for determining vehicle maneuver events based on sensor data 103. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining vehicle maneuver events based on sensor data 103, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 121 for determining vehicle maneuver events based on sensor data 103.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to determine vehicle maneuver events based on sensor data 103 as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine sensor data 103. The memory 1005 also stores the data associated with or generated by the execution of the inventive steps.

Figure 11:
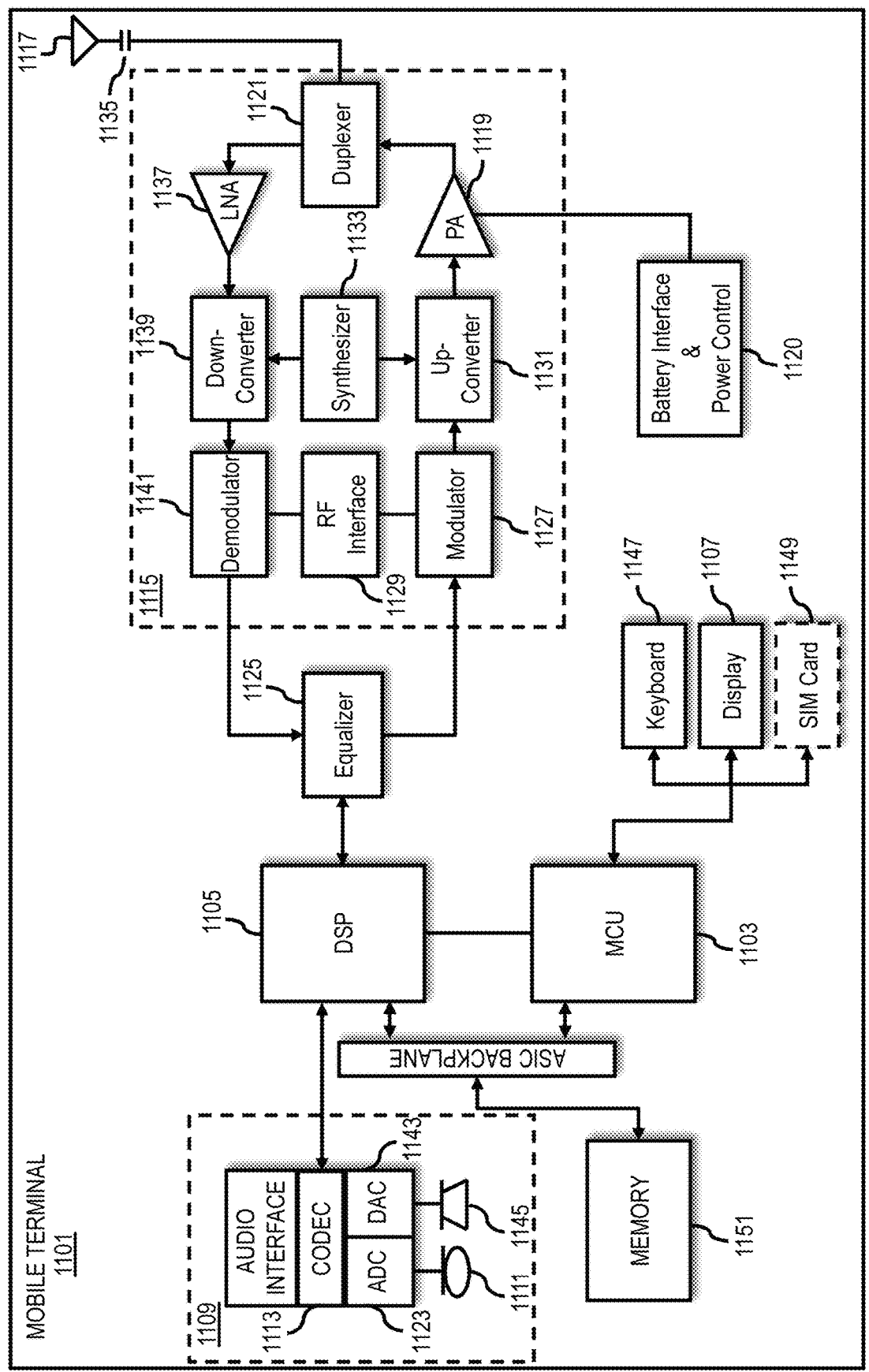
FIG. 11 is a diagram of a mobile terminal that can be used to implement an embodiment.

FIG. 11 is a diagram of exemplary components of a mobile terminal (e.g., UE 105) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to determine vehicle maneuver events based on sensor data 103. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by a processor, sensor data from a sensor of a device associated with a vehicle, wherein the sensor data includes a maneuver parameter represented using a device frame of reference;
   transforming the maneuver parameter from the device frame of reference to an Earth frame of reference, wherein the maneuver parameter is an angle change in the Earth frame of reference over a time period;
   iteratively extending the time period for determining the angle change by an extension period based on determining that the angle change is greater than a threshold angle;
   automatically detecting a maneuver event of the vehicle based on the maneuver parameter as transformed to the Earth frame of reference, wherein the maneuver event includes a turning event; and
   providing the detected maneuver event to a signaling unit associated with the vehicle.

2. The method of claim 1, wherein the signaling unit initiates a visual presentation, an audio presentation, or a combination thereof to indicate the detected maneuver event.

3. The method of claim 1, wherein the turning event is determined over the iteratively extended time period.

4. The method of claim 3, wherein the turning event is represented by an inclination, an angular span, or a combination thereof of the iteratively extended time period.

5. The method of claim 1, wherein the sensor of the device is a gyroscope, and wherein the transforming of the maneuver parameter is based on rotation vector data of the device determined based on inertial measurement unit data.

6. The method of claim 1, wherein the maneuver event is a braking event, and wherein the sensor of the vehicle is an accelerometer.

7. The method of claim 6, wherein the transforming of the maneuver parameter from the device frame of reference to the Earth frame of reference is based on accelerometer data collected from the accelerometer measured in a rest state.

8. The method of claim 1, wherein the vehicle is a micro-mobility vehicle.

9. The method of claim 1, wherein the device is fixed to the vehicle at an unknown orientation relative to the vehicle.

10. An apparatus comprising:
    at least one processor; and
    at least one memory including computer program code for one or more programs,
    the at least one memory and the computer program code configured to, with the at least one processor, cause the apparatus to perform at least the following,
       determine sensor data from a sensor of a device associated with a vehicle, wherein the sensor data includes a maneuver parameter represented using a device frame of reference;
       transform the maneuver parameter from the device frame of reference to an Earth frame of reference, wherein the maneuver parameter is an angle change in the Earth frame of reference over a time period;
       iteratively extend the time period for determining the angle change by an extension period based on determining that the angle change is greater than a threshold angle;
       automatically detect a maneuver event of the vehicle based on the maneuver parameter as transformed to the Earth frame of reference, wherein the maneuver event includes a turning event; and
       provide the detected maneuver event to a signaling unit associated with the vehicle.

11. The apparatus of claim 10, wherein the maneuver event is a braking event, and wherein the sensor of the vehicle is an accelerometer.

12. A non-transitory computer-readable storage medium carrying one or more sequences of one or more instructions which, when executed by one or more processors, cause an apparatus to perform:

determining sensor data from a sensor of a device associated with a vehicle, wherein the sensor data includes a maneuver parameter represented using a device frame of reference;

transforming the maneuver parameter from the device frame of reference to an Earth frame of reference, wherein the maneuver parameter is an angle change in the Earth frame of reference over a time period;

iteratively extending the time period for determining the angle change by an extension period based on determining that the angle change is greater than a threshold angle;

automatically detecting a maneuver event of the vehicle based on the maneuver parameter as transformed to the Earth frame of reference, wherein the maneuver event includes a turning event; and providing the detected maneuver event to a signaling unit associated with the vehicle.

13. The non-transitory computer-readable storage medium of claim 12, wherein the maneuver event is a braking event, and wherein the sensor of the vehicle is an accelerometer.

* * * * *